Figure 5:
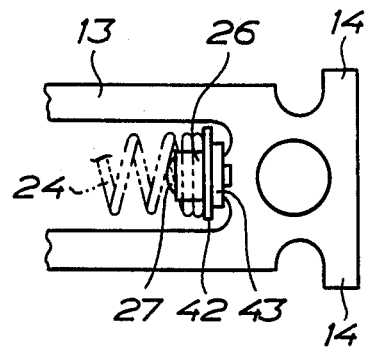

United States Patent [19]

Haglund

[11] Patent Number: 4,571,471
[45] Date of Patent: Feb. 18, 1986

[54] VEHICLE SAFETY BELT LOCK HAVING AN ELECTRIC CONTACT

[75] Inventor: Lennart Haglund, Vårgårda, Sweden
[73] Assignee: AB Stil-Industri, Vårgårda, Sweden
[21] Appl. No.: 586,024
[22] Filed: Mar. 5, 1984
[30] Foreign Application Priority Data
  Mar. 3, 1983 [SE] Sweden ................. 8301163
[51] Int. Cl.⁴ ........................................ H01H 3/16
[52] U.S. Cl. ...................... 200/61.58 B; 307/105 B; 340/52 E
[58] Field of Search ............ 307/105 B; 200/61.58 B; 340/52 E; 280/801

[56] References Cited

U.S. PATENT DOCUMENTS 4,144,423 3/1979 Fohl ................. 307/105 B

FOREIGN PATENT DOCUMENTS 1927151 12/1969 Fed. Rep. of Germany .... 340/52 E

OTHER PUBLICATIONS

PCT Publication WO81/03603 published Dec. 24, 1981.

Primary Examiner—A. D. Pellinen
Assistant Examiner—Morris Ginsburg
Attorney, Agent, or Firm—Merchant, Gould, Smith, Edell, Welter & Schmidt

[57] ABSTRACT

The invention relates to a device in a vehicle safety belt lock comprising a lock member (13) mounted to engage a lock tongue (17), the lock member being pivotable between engaged and disengaged positions. Furthermore, the lock comprises an ejector (22) which can be displaced against spring bias by insertion of the lock tongue, the biasing spring of said ejector comprising a helical spring which is engaged between the ejector or a member (20) operatively associated therewith, and the lock member. On the lock member, the spring is passed onto a guide projection (27) at the end position thereof, the movable contact member (42) of an electric contact being mounted for rocking movement on the one end of the biasing spring in order to be engaged with and disengaged from stationary contact members (33, 34) as the ejector is moved against or under spring bias by a rocking movement of the movable contact member caused by the spring.

6 Claims, 7 Drawing Figures

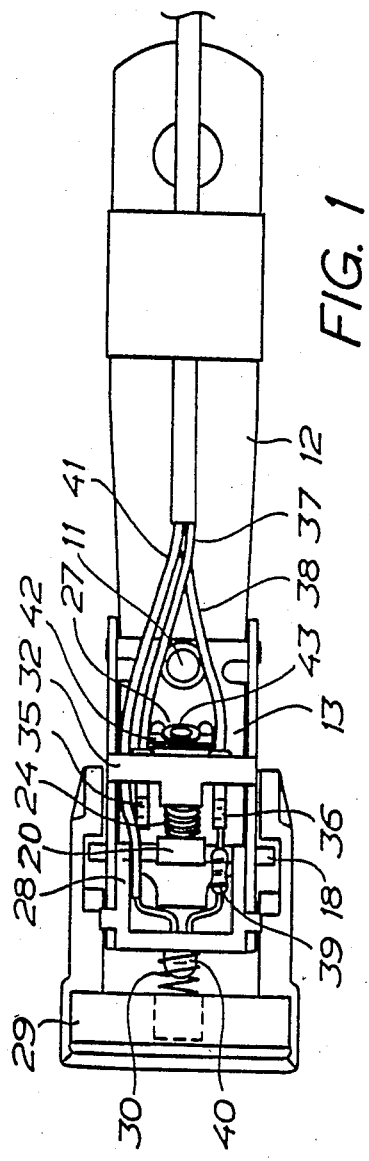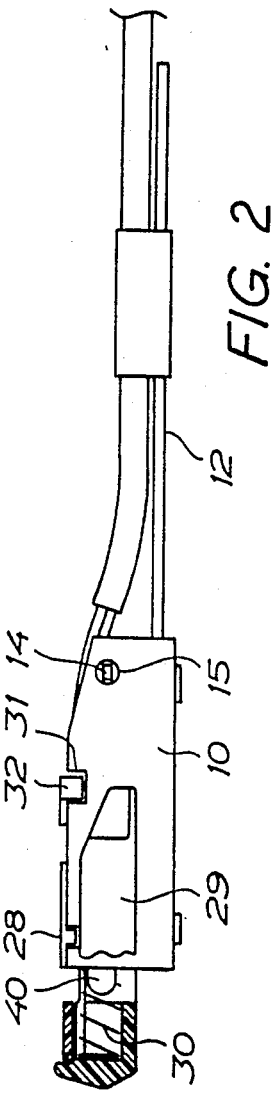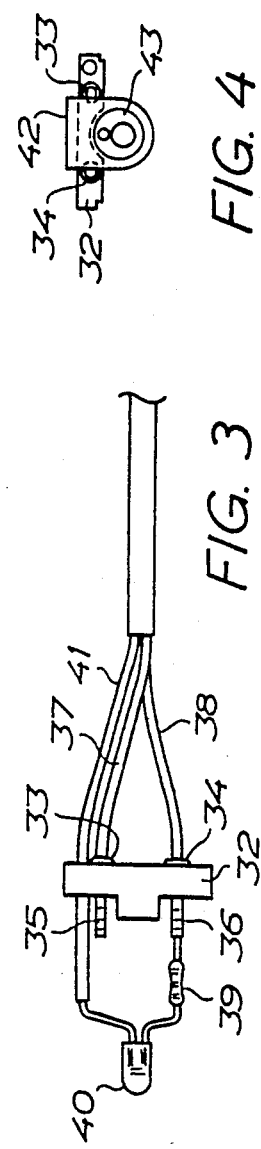

VEHICLE SAFETY BELT LOCK HAVING AN ELECTRIC CONTACT

The present invention relates to a vehicle safety belt lock comprising a lock member mounted to engage a lock tongue, said member being pivotable between engaged and disengaged positions and having an ejector which is displaceable against spring bias by insertion of the lock tongue, the biasing spring of said ejector comprising a helical spring engaged between the ejector, or a member operatively associated therewith, and the lock member where the spring is passed onto a guide projection at the end portion thereof.

A lock of this kind is described in the PCT Publication No. WO 81/03603. The lock described therein is a reliable one capable of taking up heavy loads despite its small dimensions and having a very reliable lock mechanism apart from being of a very simple construction as far as structure and manufacture are concerned.

The development of the vehicle safety belts has eventually implied to the security system of vehicles additional functions and, among other things, it is now common to combine a vehicle safety belt with some kind of signalling device emitting a signal if the belt has not been fastened when starting the ride. For this purpose an electric contact in the lock is needed which is activated when the lock tongue is inserted, to interrupt or close a signal circuit. Considering the small dimensions of the lock referred to herein and the compact structure or the lock mechanism thereof it has proved difficult to include an electric contact of a reliable function into the lock.

The invention solves this problem by partly utilizing in the electric contact portions of the lock mechanism proper as functional parts of the contact, such that the electric contact can be integrated with the lock mechanism within the restricted space available within the outer housing of the lock, without the need for any essential modification of the lock mechanism which may thus be maintained in its present reliable condition.

According to the invention, said problem has been solved by providing in a lock of the kind referred to above a device.

Figure 6:
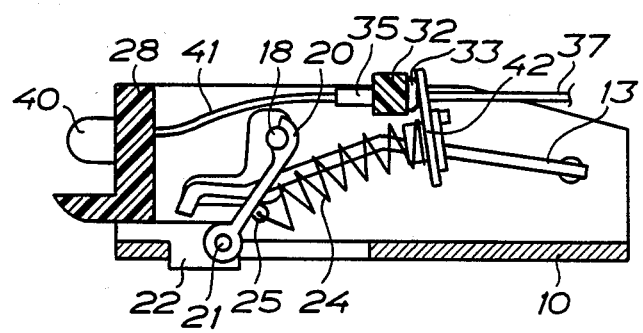
Figure 7:
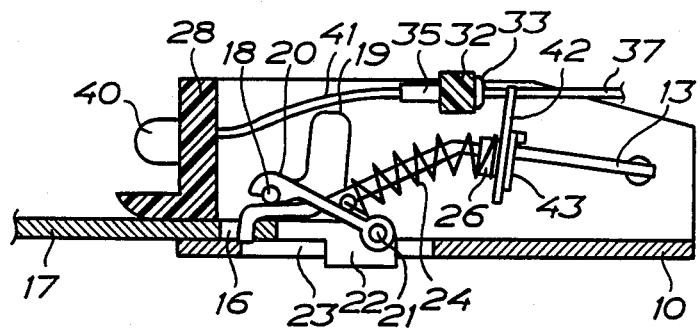

In order to explain the invention in more detail an embodiment thereof will be described below with reference to the accompanying drawings in which FIG. 1 is a plan view of the lock constructed according to the invention without the housing and without the lock tongue, FIG. 2 is a side view, partly broken, of the lock in FIG. 1, FIG. 3 is a plan view of a lamp holder in the lock, which carries also the stationary contact member of the electrical contact, FIG. 4 is an end view of the electrical contact, FIG. 5 is a plan view of the movable contact member of the electrical contact, which is mounted to the lock member partly shown, FIG. 6 is a longitudinal cross-sectional view of the lock without the lock tongue and with the contact in engaged position, and FIG. 7 is a longitudinal cross-sectional view of the lock with the lock tongue inserted therein and with the contact in disengaged position.

The lock shown comprises a metal frame 10 which is U-shaped in cross section and which is connected at a rivet 11 to an anchoring fitting 12. In the frame a lock member 13 is pivoted by projections 14 of the lock member being pivotally received in openings 15 in the side walls of the frame 10. The lock member is mounted to co-operate with an aperture 16 of a lock tongue 17 which is partly shown in FIG. 7, to retain the lock tongue in the lock when the tongue is inserted therein. A block bar 18 is received at its ends in angular slots 19 in the side walls of the frame 10 and is connected with a linking arm 20 which is pivoted at pins 21 to an ejector 22. This ejector is displaceably guided in a longitudinal slot 23 in the web of the frame 10 to move in the longitudinal direction of the lock within the space which is to receive the lock tongue 17. A helical pressure spring 24 is engaged at 25 to the linking arm 20 at one and thereof, the other end of the spring engaging the lock member 13 where the spring is passed onto a plastic sleeve 26 which, in its turn, is loosely passed onto a guide projection 27 on the lock member 13.

When the lock is not used the operative elements of the lock described so far will occupy the positions shown in FIG. 6, the ejector 22 being held in an advanced position and the lock member 13 being held in a raised position (disengaged position) under the bias of the spring 24. When the lock tongue 17 is inserted into an insertion slot of the lock, which is defined between the web of the frame 10 and a plastic member 28 mounted on the frame, the ejector 22 is moved back, the lock member 13 is swung down to engage the lock tongue 17 in the aperture 16 (engaged position) against the bias of the spring 24, the functional elements of the lock occupying the position according to FIG. 7. The lock member then is blocked by the bar 18.

In order to release the lock tongue a plastic push button 29 is displaceably mounted on the frame 10, said button being operatively connected with the end portions of the blocking bar 18 which project through the slots 19, and are depressed against the bias pressure of a spring 30 for adjustment of the blocking bar 18 and, consequently, the rest of the elements of the lock are moved to the position according to FIG. 6.

The lock thus constructed, which has been described only summarily with respect to the construction and the function thereof since a more detailed description is included in the patent application referred to above, is arranged according to the invention in the following way.

The upper edge of the side walls of the frame 10 forms two rectangular notches 31 receiving a cross piece 32 made of plastic. Said cross piece is shown also in FIGS. 3 and 4. In the cross piece, two metal lead-through bushings are mounted which have a head 33 and 34, respectively, on one side of the cross piece 32 and a tube-shaped shaft 35 and 36, respectively, on the other side of the cross piece 32. In the bushing 33, 35, a cable 37 is fixed by compressing the shaft 35 around the copper conductor of the cable which thus is clamped to the shaft. In the same manner a cable 38 is fixed in the bushing 34, 36, one terminal, however, and a resistor 39 being fixed to the shaft 36. The other connection of the resistor 39 is connected to a light emitting diode 40 to which is connected also a cable 41 which is drawn through an aperture in the cross piece 32. The light emitting diode 40 is 1nserted through an opening in the plastic member 28 and is received within the pressure spring of the push button 29. The light emitting diode may serve to illuminate the push button 29 from the interior thereof, said push button consisting of a plastic material which is more or less translucent, such that it will be easy to find the push button. However, the light emitting diode may also be arranged to illuminate the insertion opening for the lock tongue 17. The light emitting diode is energized through the cables 38 and 41 of Which the wire 38 may be the live cable.

The heads 33 and 34 of the two bushings in the cross piece 32 constitute stationary contact members of an electric contact, the movable contact member of which is formed by metal washer 42 which is passed onto the sleeve 26 and held in position between an annular flange 43 on the sleeve and the end of the pressure spring 24. The sleeve has a relatively large inner diameter in relation to the guide projection 27, such that the sleeve, and consequently the washer 42 arranged as the movable contact, can rock on the guide projection. When the lock tongue is not inserted into the lock according to FIG. 6, the washer 42 is held under the bias of the spring 24 in such a position on the guide projection 27, due to the geometry of the lock mechanism, that it will engage the two heads 33 and 34 of the bushings in the cross piece 32 and thus will establish an electric connection therebetween. This means that an electric connection is established between the cables 37 and 38 such that the cable 37 is connected to the live cable 38. The cable 37 can be included in an electric circuit which comprises light and/or sound signal means, e.g. an electrically illuminated sign indicating that the vehicle safety belt should be fastened, or a buzzer, which, when emitting sound, indicates that the vehicle safety belt has not been fastened. Such circuits are nowadays common in vehicles and they are activated when the ignition of the vehicle is switched on.

When the lock tongue 17 is inserted into the lock, the ejector 22 is forced back against the bias of the spring 24 and the lock member 13 is tilted into the engaged position thereof, the state according to FIG. 7 being achieved, and during these movements of the operative parts of the lock mechanism the pressure spring 24 will be forced upwards to form a bow with the result that the sleeve 26 and, consequently, the washer 42 will be rocked on the guide projection 27 such that the plate is disengaged from the heads 33 and 34 of the bushings in the cross piece 32. The electrical connection between the cables 37 and 38 will be interrupted and the emittance of signals will cease. The washer 42 arranged as the movable contact member does not perform a rocking movement only when engaged with and disengaged from the stationary contact members formed by the heads 33 and 34, but also a sliding movement against the heads due to the swinging of the lock member 13 between engaged and disengaged positions, the electric contact being to some extent self-cleaning due to this relative sliding movement between the contact members.

It will appear from the description above that the electric contact is completely integrated with the lock mechanism which otherwise does not differ, apart from minor constructive details, from the embodiment shown and described in the PCT Publication referred to above. It is obvious that the electric contact may be used for controlling any electric circuit; the most obvious application thereof is, however, to be used for controlling a signal circuit in order to stimulate the driver or passenger of the vehicle to fasten the safety belt before starting a ride.

The invention may be modified within the scope of the claims with respect to the constructional embodiment of the electric contact. It is e.g. feasible to mount the cross piece 32 in another way than that shown herein. In order to increase the pressure of the washer 42 against the stationary contact members, i.e. the heads 33 and 34, the guide projection 27 may be angled somewhat downwards, e.g. 7° to 10° in relation to the rest of the lock member 13.

A specific advantage of the embodiment of the vehicle safety belt lock of the invention, which has been shown and described, is that the cross piece 32 with the stationary contact members 33 and 34 attached to the cross piece, and the light emitting diode 40 and the resistor 39 supported by the cables 38 and 41 form a separate unit which can be easily mounted in the lock. For mounting the unit in the lock the cross piece 32 can be loosely positioned in the notches 31 of the frame 10, the light emitting diode 40 being inserted into the spring 30, and then the unit can be held in place by a plastic housing which is mounted to the lock in the conventional manner.

I claim:

1. A device in vehicle safety belt locks comprising a lock member for engagement with a lock tongue, said lock member being pivotable between engaged and disengaged positions, an ejector, spring means biasing the ejector which is displaceable against the spring bias by the insertion of said lock tongue said biasing spring means comprising a helical spring operatively engaged between the ejector and the lock member, a guide projection receiving one end of said spring, and an electric contact means including stationary contact members and a movable contact member, said movable contact member being mounted for rocking movement on said guide projection at said one end of the spring to be engaged with and disengaged from the stationary contact members by a rocking movement of the movable contact members, caused by the spring as the ejector is moved against and by the spring bias, respectively.

2. A device according to claim 1, further comprising a sleeve mounting said movable contact member, which is mounted for rocking movement on the guide projection and is inserted into said one end of the spring.

3. A device according to claim 2 wherein the movable contact member comprises a washer which is engaged between said one end of the spring and an annular flange formed by said sleeve.

4. A device according to claim 1 wherein the stationary contact members comprise metal bushings for attaching electric cables, and a member made of electrically insulating material, mounting said bushings.

5. A device according to claim 4, further comprising a light emitting diode and cables supported by said electrically insulating member, said diode being connected to the cables to be supported thereby.

6. A device according to claim 5 wherein the electrically insulating member with the stationary contact members and the light emitting diode mechanically supported by the cables form a separate unit inserted into the lock member.

* * * * *